United States Patent
Zeng et al.

(10) Patent No.: US 6,990,196 B2
(45) Date of Patent: Jan. 24, 2006

(54) CROSSTALK IDENTIFICATION IN XDSL SYSTEMS

(75) Inventors: Chaohuang Zeng, Palo Alto, CA (US); Carlos Aldana, Stanford, CA (US); Atul Salvekar, Stanford, CA (US); John M. Cioffi, Atherton, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 365 days.

(21) Appl. No.: 09/788,267

(22) Filed: Feb. 16, 2001

(65) Prior Publication Data

US 2002/0136397 A1 Sep. 26, 2002

Related U.S. Application Data

(60) Provisional application No. 60/266,919, filed on Feb. 6, 2001.

(51) Int. Cl.
*H04J 3/10* (2006.01)

(52) U.S. Cl. .................................. 379/417; 370/201
(58) Field of Classification Search ................ 379/417, 379/22.02, 27.03; 370/201
See application file for complete search history.

(56) References Cited

U.S. PATENT DOCUMENTS

| | | | |
|---|---|---|---|
| 4,995,104 A | * 2/1991 | Gitlin | ......................... 370/201 |
| 5,271,037 A | 12/1993 | Szechenyi | |
| 5,608,755 A | 3/1997 | Rakib | |
| 5,887,032 A | 3/1999 | Cioffi | |
| 6,055,297 A | 4/2000 | Terry | |
| 6,134,283 A | * 10/2000 | Sands et al. | ................. 375/354 |
| 6,160,511 A | 12/2000 | Pfeil et al. | |
| 6,160,790 A | 12/2000 | Bremer | |
| 6,173,021 B1 | * 1/2001 | Bingel et al. | ................ 379/416 |

OTHER PUBLICATIONS

Cioffi et al., "Fast, recursive–Lease–Squares Transversal Filters for Adaptive Filtering", IEEE Trans. on Acoustics, Speech, and Signal Proc., Apr. 1984, vol. ASSP–32, No. 2, pp. 304–337.
Cioffi, "The Block–Processing FTF Adaptive Algorithm", IEEE Trans. On Acoustics, Speech, and Signal Proc., Feb. 1986, vol. ASSP–34, No. 1, pp 77–90.

* cited by examiner

*Primary Examiner*—Sinh Tran
*Assistant Examiner*—Daniel Swerdlow (57) ABSTRACT

Methods, apparatus and systems for identifying crosstalk interference in xDSL systems are disclosed and are useful in a variety of xDSL systems to assist in the provisioning, maintenance and diagnosis of the xDSL system and in spectral management and assignments. Signal data are collected from a receiver, a primary transmitter and any crosstalk transmitters. The signal data are resampled, if necessary. A first estimate of the timing offset between the received signal and each crosstalk signal is then obtained by cross-correlating the received data with the transmitted crosstalk data. The first timing offset estimate is then used in connection with a least-squares estimation of the crosstalk response for the considered crosstalk data and a second estimate of the timing offset. The invention may be used at a third party site remote from the system transmitters and receivers. The crosstalk identification of the present invention can be used in dynamic spectrum management for DSL services and signals.

13 Claims, 5 Drawing Sheets

CROSSTALK IDENTIFICATION IN XDSL SYSTEMS

CROSS-REFERENCE TO RELATED APPLICATION

This application claims benefit of U.S. Provisional Application Ser. No. 60/266,919 filed on Feb. 6, 2001, the disclosure of which is incorporated herein by reference.

BACKGROUND OF THE INVENTION

The present invention relates to data transmission systems and, more particularly, to the identification of crosstalk interference in a communication system.

Digital subscriber line (DSL) technology uses the existing telephone twisted pairs to provide high-speed internet access services to both residential and business customers. There are many types of DSLs, which are generically referred to as xDSL, including basic rate DSL (ISDN), high-bit-rate DSL (HDSL), second generation HDSL (HDSL2), asymmetric DSL (ADSL), symmetrical DSL (SDSL), and very-high-bit-rate DSL (VDSL). Today in the United States, several million telephone lines between central offices and subscribers are deployed with xDSL technology, and the number of the subscribers is rising rapidly.

These wide band modulation approaches present inherent obstacles that must be overcome. One particular problem relates to crosstalk interference that is introduced to the twisted pair transmission line and received by the modem. As is well known to those skilled in the art, crosstalk interference is unwanted interference (signal noise) that is passed between adjacent network cables or devices. Crosstalk generally occurs due to coupling between wire pairs when wire pairs in the same or a nearby bundle are used for separate signal transmission. In this manner, data signals from one or more sources may be superimposed on and contaminate a data signal from a second source. The crosstalk includes near-end crosstalk (NEXT) and far-end crosstalk (FEXT). In ADSL and VDSL systems, frequency-division duplexing can be used to avoid NEXT. Nevertheless, NEXT may still exist because of other types of services like ISDN, HDSL, HDSL2, SDSL and T1.

As can be appreciated, the data signals being transmitted over the twisted-pair phone lines can be significantly degraded by the crosstalk interference generated on one or more adjacent twisted-pair phone lines in the same and/or a nearby bundle. As the speed of the data transmission increases, the problem worsens. For example, in the case of VDSL signals being transmitted over the twisted-pair phone lines, the crosstalk interference can cause significant degradation of the VDSL signals, including substantially limiting the maximum data rate of an individual line. To prevent a breakdown of currently deployed systems, operators frequently assume and compensate for the worst case scenario (that is, the highest level of crosstalk interference). However, this assumption is often too pessimistic when compared to actual crosstalk interference on the transmission line and hence unnecessarily limits the overall performance of the system. If actual crosstalk interference could be identified, then the crosstalk could either be removed (or lessened) or the system could be operated in a manner that does not unnecessarily compensate for a level of crosstalk that is not present.

Identification of crosstalk coupling functions within telephone lines can yield several overwhelming benefits. First, the crosstalk functions can be used in a multi-user detector in a line's modem to cancel the strong interference from other lines. Second, it can improve the data rate (or the line reach scope) of a system by better spectrum management, such as a better spectrum assignment for different users. For example, if one user causes strong crosstalk to another user in a particular frequency band, the modem may be switched to avoid transmitting in this frequency band in lieu of a multi-user detector. Third, crosstalk profiles are invaluable for the telephone operators to maintain, diagnose, and expand the current systems.

However, it has proven to be exceedingly difficult to identify crosstalk functions among copper wires because lines in the same bundle could belong to different service operators as a result of the unbundling process and regulatory action undertaken in many parts of the world. For example, in the United States and some other countries, competitive local exchange carriers (CLECs) can lease the telephone lines from incumbent local exchange carriers (ILECs, the traditional phone companies) and offer xDSL services to the local subscribers. As a result, the modems from different operators are asynchronous. Even within the same service operator, different types of services (HDSL, ADSL, ISDN, etc.) are offered in the same bundle and these services have different symbol rates.

Because the modems in the same bundle could belong to different service operators (CLECs and ILECs), the time stamps of the data from different operators' modems can be offset by several milliseconds. Therefore, an additional problem with identifying crosstalk interference with existing xDSL systems is the presence of timing differences between the transmitted data from different users and the received data from one designated receiver. Currently, the timing difference between two signals can be greater than one thousand data symbols.

Moreover, in the multi-operator environment, spectral compatibility among the different operators is a major concern. Spectral compatibility is fundamentally determined by the crosstalk level caused by different users. For the foregoing reasons, some level of coordination and agreement in which all operators' interests are fairly considered and benefited would be helpful to all users of such xDSL systems.

Therefore, crosstalk problems arising from using twisted-pair phone lines with high data Transmission rates, including ADSL and VDSL for example, become a substantial impediment to a receiver being able to properly receive the transmitted data signals. Thus, there is a need to provide techniques to identify and determine the timing differences in various data signals and to identify and determine the magnitude and phase of crosstalk interference so that steps can be taken to reduce or eliminate such interference, improve line maintenance and assist in spectrum assignment.

SUMMARY OF THE INVENTION

Broadly speaking, the present invention is a technique for identifying crosstalk interference in xDSL systems. The technique is useful in a variety of xDSL systems and can be used to assist in the provisioning, maintenance and diagnosis of the xDSL system and in spectral management and assignments. The invention can be implemented in numerous ways, including as a method, system or modular crosstalk identifier.

In one embodiment, the invention relates to a method of identifying crosstalk interference in a received data signal. Initially, signal data are collected from a receiver, a primary transmitter and any crosstalk transmitters. The signal data are resampled, if necessary. A first estimate of the timing offset between the received signal and each crosstalk signal is then obtained by cross-correlating the received data with the transmitted crosstalk data. The first timing offset estimate is then used in connection with a least-squares estimation of the crosstalk response for the considered crosstalk data and a second estimate of the timing offset.

In some embodiments, multiple crosstalk signals are superimposed on the primary signal. If the crosstalk signals are all of comparable strength, they can be identified together. If some of the crosstalk signals are materially stronger than others, the relatively strong crosstalk signals are identified and removed from the received signal. Thereafter, the method can be re-applied to weaker signals to identify and remove crosstalk interference in successive applications of the method.

In other embodiments, the method of the present invention can be applied as part of a multiuser detection service, provisioning of xDSL services, xDSL diagnosis services, xDSL system maintenance services and/or spectral management within an xDSL system.

The invention relates, in another embodiment, to a system for identifying crosstalk in which a number of transmitters transmit various signals, including a primary transmitter that transmits a primary signal to a receiver. A processor includes a data collector that collects data from the transmitters and the receiver. A timing offset estimator in the processor takes the collected data and generates a first estimate of a timing difference between the primary signal and each transmitted signal. Each first estimate of the timing offset corresponding to a transmitted signal is then used by a crosstalk identifier in the processor to calculate the crosstalk response function corresponding to that transmitted signal.

In other embodiments, the timing offset estimator uses a cross-correlator to perform a cross-correlation of the primary signal and each of the other transmitted signals. A least-squares estimator is used by the crosstalk identifier thereafter to identify the crosstalk response. The processor can be located anywhere in the system, but may be located at a site remote from the receiver and the transmitters.

Another embodiment of the present invention is a crosstalk identifier having a collector configured to collect data from a primary signal transmitter, at least one crosstalk transmitter and a receiver. The crosstalk identifier contains a first estimator that determines a first estimate of the timing offset between the data collected from the receiver and the data collected from the crosstalk transmitters. This first estimate of the timing offset is used by a second estimator in the crosstalk identifier to determine the crosstalk response function of the crosstalk transmitter's data. A cross-correlator can be used in the first estimator and a least-squares estimator can be used in the second estimator. The crosstalk identifier can be configured to operate at a location remote from the receiver and the transmitters.

Other aspects and advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Methods, devices and protocols appropriate for implementing a system for identifying crosstalk in xDSL systems will now be described in detail with reference to a few preferred embodiments thereof and as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or other features and aspects of the invention as presented have not been described in detail in order to avoid unnecessarily obscuring the present invention.

Briefly, the present invention involves collecting data relating to the transmission and reception of data on communication lines in which crosstalk arises. This collected data is then cross-correlated to determine the timing differences between various lines' signals. Further processing of the data yields better estimates of the signals' timing differences and identification of crosstalk interference between the lines. The data processing procedures may be applied iteratively, removing successive levels of crosstalk to permit identification of additional crosstalkers, especially weaker crosstalkers such as FEXT signals. Finally, the information obtained regarding the crosstalk interference can be used to reduce or eliminate crosstalk on the lines, to assist in spectral management and assignments, and to assist line operators in maintaining, diagnosing and expanding services provided on the lines.

Figure 1:
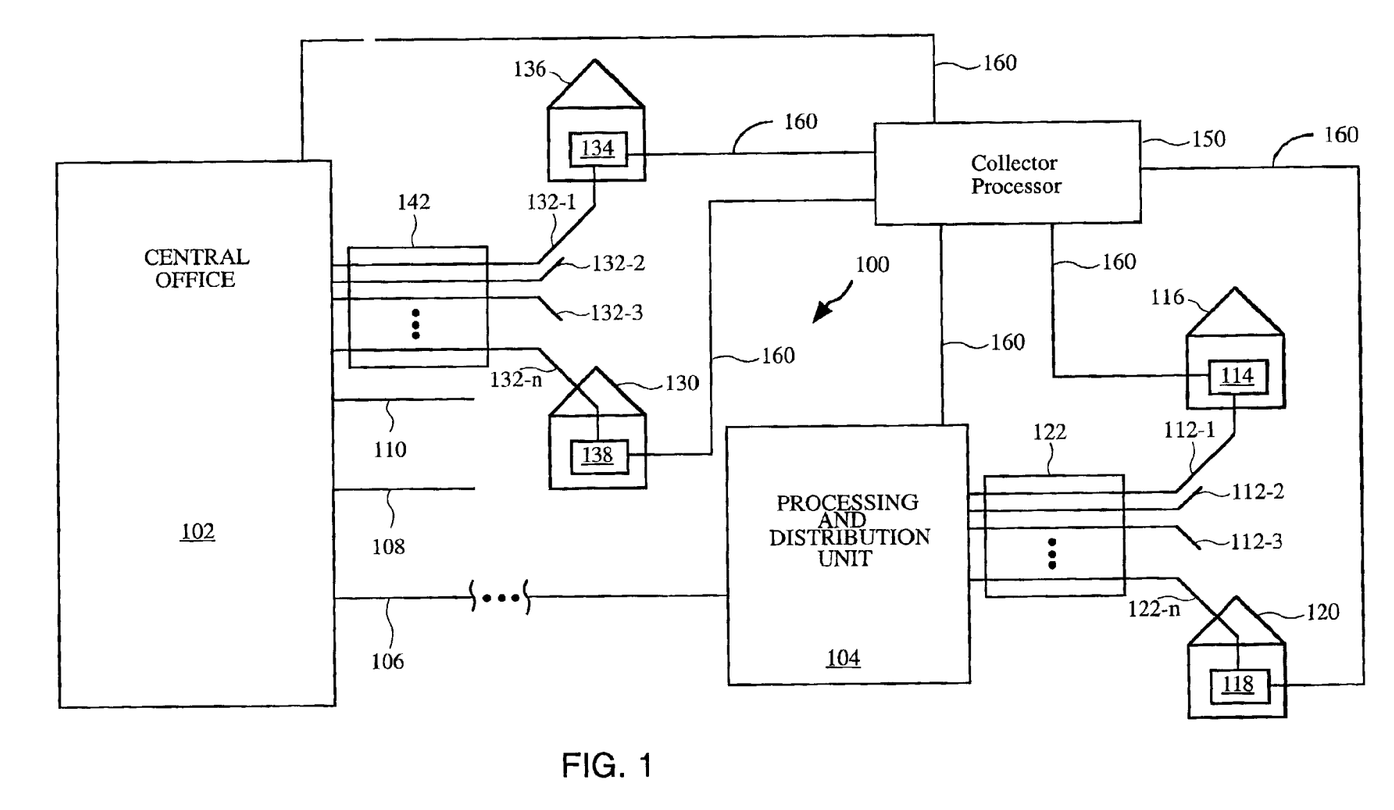
FIG. 1 is a block diagram of a subscriber line based communication system having a plurality of twisted pair phone lines that extend from an optical network unit or central office to receivers in remote units and a third party data collection and crosstalk identification site, in accordance with one embodiment of the present invention.

FIG. 1 is a block diagram of an exemplary telecommunications network 100 suitable for implementing the invention. The telecommunications network 100 includes a central office 102. The central office 102 services a plurality of distribution posts to provide data transmission to and from the central office 102 to various remote units. In this exemplary embodiment, each of the distribution posts is a processing and distribution unit 104 (node). The processing and distribution unit 104 is coupled to the central office 102 by a high speed, multiplexed transmission line 106 that may take the form of a fiber optic line. Typically, when the transmission line 106 is a fiber optic line, the processing and distribution unit 104 is referred to as an optical network unit (ONU). The central office 102 also usually interacts with and couples to other processing and distribution units (not shown) through high speed, multiplexed transmission lines 108 and 110. In one embodiment, the processing and distribution unit 104 includes at least one modem (central modem).

The processing and distribution unit 104 services a multiplicity of discrete subscriber lines 112-1 through 112-n. Each subscriber line 112 typically services a single end user. The end user has a remote unit suitable for communicating with the processing and distribution unit 104 at very high data rates. More particularly, a remote unit 114 of a first end user 116 is coupled to the processing and distribution unit 104 by the subscriber line 112-1, and a remote unit 118 of a second end user 120 is coupled to the processing and distribution unit 104 by the subscriber line 112-n. The remote units 114 and 118 include a data communications system capable of transmitting data to and receiving data from the processing and distribution unit 104. In one embodiment, the data communication systems are modems. The remote units 114 and 118 can be incorporated within a variety of different devices, including for example, a telephone, a television, a monitor, a computer, a conferencing unit, etc. Although FIG. 1 illustrates only a single remote unit coupled to a respective subscriber line, it should be recognized that a plurality of remote units can be coupled to a single subscriber line. Also, as shown in FIG. 1, subscriber lines 132-1 through 132-n can be connected directly to the central office 102 and be bundled in a shielded binder 142.

The subscriber lines 112 serviced by the processing and distribution unit 104 are bundled in a shielded binder 122 as the subscriber lines 112 leave the processing and distribution unit 104. The shielding provided by the shielded binders 122 and 142 generally serve as good insulators against the emission (egress) and reception (ingress) of electromagnetic interference. However, the last segment of each of these subscriber lines, commonly referred to as a "drop" branches off from the shielded binder 122 and is coupled directly or indirectly to the end user's remote units. The "drop" portion of the subscriber line between the respective remote unit and the shielded binder 122 is normally an unshielded, twisted-pair wire. In most applications the length of the drop is not more than about 30 meters.

Figure 2A:
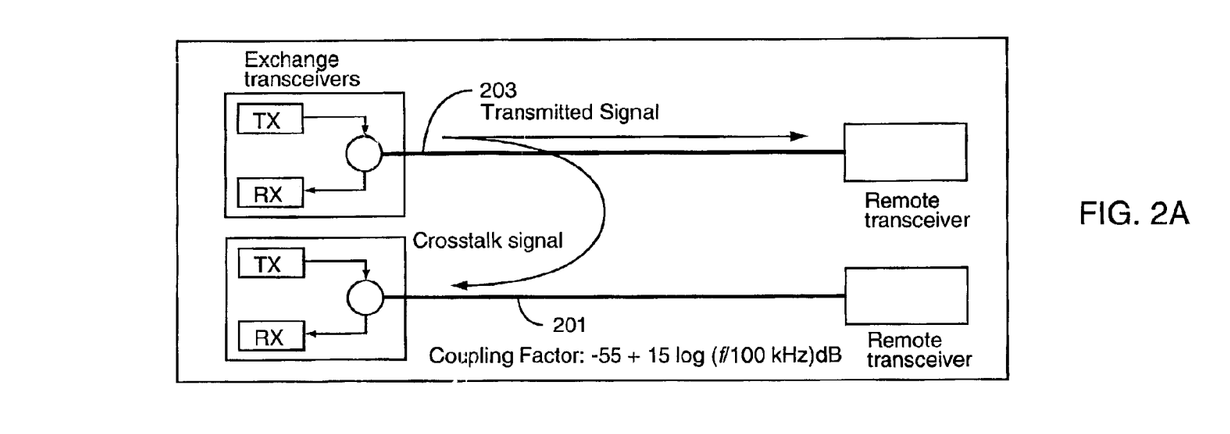
FIG. 2a is an illustration of near-end crosstalk interference between a pair of communication lines.
Figure 2B:
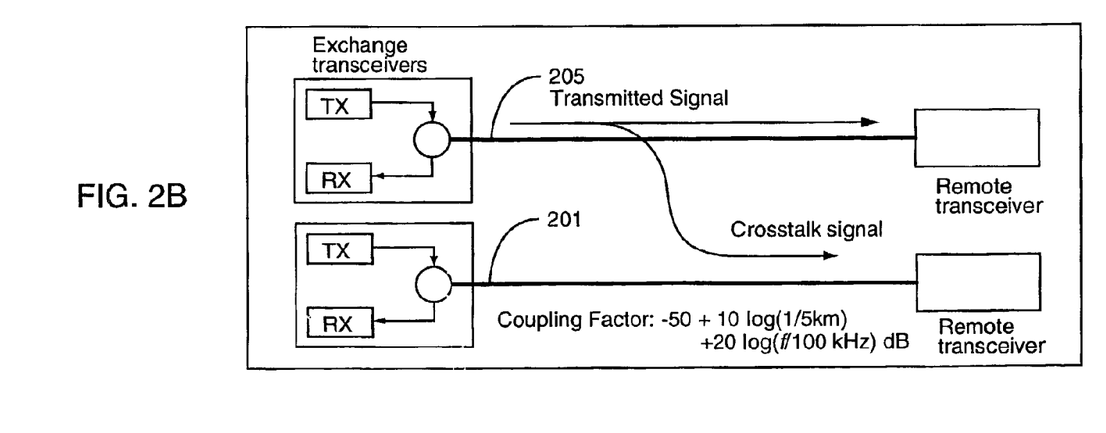
FIG. 2b is an illustration of far-end crosstalk interference between a pair of communication lines.

Crosstalk interference occurs primarily within the shielded binder 122 where the subscriber lines 112 are tightly bundled, although crosstalk can arise in other locations as well, including among lines in different binders. Hence, when data is transmitted on some of the subscriber lines 112 while other subscriber lines are receiving data, the crosstalk inference induced becomes a substantial impairment to proper reception of data. There are two types of crosstalk interference that typically are of concern. Near-end crosstalk (NEXT), shown in FIG. 2a, is interference that appears on a primary line 201 at the same end of the line as the source of the interference 203. Its level is substantially independent of the length of the line and tends to be the predominant type of crosstalk interference found in xDSL, systems. Far-end crosstalk (FEXT), shown in FIG. 2b, is interference that appears at the end of a line 201 opposite or farthest from the end of the line causing the interference 205.

Data Collection

Figure 3:
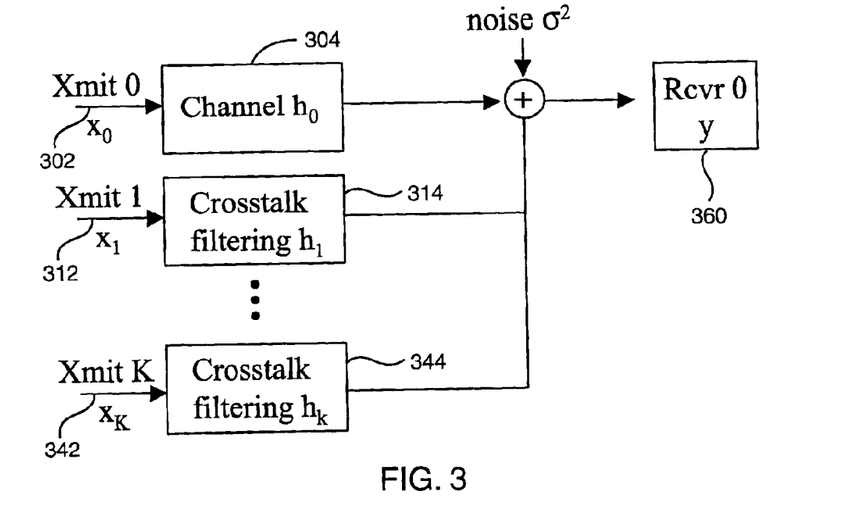
FIG. 3 is an illustration of a generic crosstalk model for a receiver in an xDSL system, in accordance with one embodiment of the present invention.

The generic crosstalk model of an xDSL system for a given receiver is shown in FIG. 3. A series of data streams 310-0 through 310-k are sent through a series of transmission lines 320-0 through 320-k, respectively. For purposes of identifying crosstalk functions in this disclosure, one line 320-0 is considered the primary channel $h_0$, while the remaining lines 320-1 through 320-k are crosstalk functions $h_1$ through $h_k$, respectively. The primary signal on channel $h_0$, the crosstalk interference and noise 330 are all combined and finally received at a receiver 360.

It is much easier to identify crosstalk if all of the transmitted data and the received data are known. In practice, as noted above, multiple parties (including perhaps competitors) may be using various lines in bundles where crosstalk poses problems. Despite the competitive nature of the parties' relationship(s), it nevertheless appears to be in all participating parties' best interests to reduce crosstalk interference as much as possible.

With line operators not wishing to share confidential information, but having mutual interests in reducing and/or eliminating crosstalk, some level of objectively managed cooperation is preferred. Based on this fact, and as shown in FIG. 1, the preferred embodiment of the present invention uses an impartial third party site 150 to collect the transmitted data and the received data during a specified time period from all of the modems that are available for the coupling functions (crosstalk) identification. While the data collection site may be operated by an impartial third party, the site may nevertheless be located anywhere, including the central office or any other appropriate location. For example, the telephone company that operates the lines may establish an on-site facility in the central office to use the present invention in the maintenance and other line services provided for its own use and the use of its customers.

The needed level of coordination can be achieved by establishing a standardized procedure in which each operator captures the data that flow through the operator's modem (s) during a pre-defined time period and sends the captured data to the third party. For example, in a central office, service operators typically have their own DSL access multiplexers (DSLAMs) which are used to collect the transmitted and received data in each modem during a certain time period. These collected data can be sent to the third party site via internet or some other means 160. At a "customer site," each modem can store the transmitted and received data packets and send them to the third party site. Because line characteristics usually do not change very much, these data packets can be sent either offline when the modems are idle or via low-speed diagnostic channels currently used in all DSL modems.

Data Processing

The primary objective of the present invention is to identify one or more crosstalk functions, given the known transmitted data, the received data and the statistics of the noise. The collected data provide much of this information, as will be appreciated by one of skill in the art. Processing techniques and apparatus of the present invention permit analysis and processing of the collected data and yield the desired crosstalk function information.

As noted above, data are collected from modems within the communication system being evaluated. Typically, each modem time stamp relies on the central office clock. Unfortunately, these time stamps are not accurate and the difference from modem to modem can be as large as several milliseconds. Moreover, different services can exist in the same bundle(s) of telephone lines and these services frequently have different sampling rates. Therefore, a discrete (sampled) crosstalk function will vary with time if the receiver and the crosstalk transmitter belong to different services and have different symbol rates. However, if the transmitted data are resampled with the same clock used in the receiver, the crosstalk function is stationary because it reflects the physical configuration of the lines.

Resampling for Different Services

Figure 4:
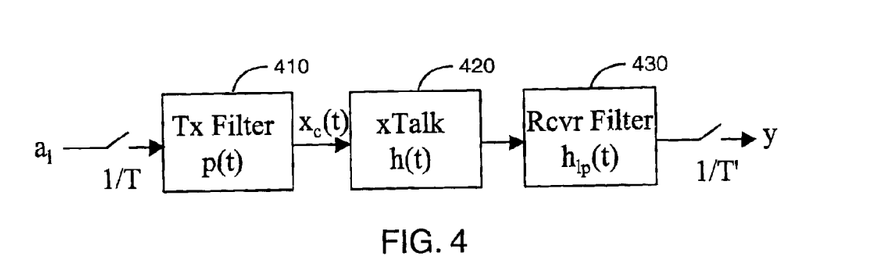
FIG. 4 is a typical baseband crosstalk diagram for an xDSL system, in accordance with one embodiment of the present invention.

FIG. 4 shows a typical baseband crosstalk diagram for xDSL systems, where p(t), h(t) and $h_{lp}(t)$ are the transmit filter 410, the crosstalk response 420, and the receiver low pass filter 430 respectively. The sampling rates for the primary transmitter and the receiver are 1/T and 1/T', respectively. The transmitted continuous time signal is:

$$x_c(t) = \sum_{l=0}^{N-1} a_l \delta(t - lT - \tau) * p(t) \tag{1}$$

where T is the sampling period, $a_l$ is the discrete data stream, N is the total number of data symbols to be transmitted, and $\tau$ is the fractional delay in terms of the receiver clock. The received signal before sampling is:

$$y_c(t) = \sum_{l=0}^{N-1} a_l \delta(t - lT) * \underbrace{p(t-\tau) * h(t) * h_{lp}(t)}_{q(t)} + n(t) \tag{2}$$

$$= \sum_{l=0}^{N-1} a_l \delta(t - lT) * \frac{1}{T'} \text{sinc}\left(\frac{t}{T'}\right) * q(t) + n(t) \tag{3}$$

$$= \underbrace{\frac{1}{T'} \sum_{l=0}^{N-1} a_l \text{sinc}\left(\frac{t - lT}{T'}\right)}_{x(t)} * q(t) + n(t) \tag{4}$$

where q(t) is the aggregated crosstalk function of concern and x(t) is the re-constructed transmitted signal. Eq. (3) above follows from the fact that $y_c(t)$ is not changed by multiplying another low-pass filter (1/T')sinc(1/T') if the receiver low pass filter $h_{lp}$ is ideal. The bandwidth of the crosstalk function q(t) is determined by the smaller one of the two filters p(t) and $h_{lp}(t)$. In other words, the identifiable band of the crosstalk is transmitted by both the signal bandwidth and the receiver cut-off bandwidth. Sampling at a rate of 1/T' yields the discrete received signal:

$$y(m) = x(m) * q(m) + n(m) \tag{5}$$

where $$x(m) = \sum_{l=0}^{N-1} a_l \text{sinc}\left(m - \frac{lT}{T'}\right). \tag{6}$$

Since both x(t) and q(t) have a bandwidth less than the Nyquist rate 1/(2T'), there is no aliasing after sampling. The resampling sinc function is preferred, but not unique; many other functions (for example, the raised cosine) can be used as alternative resampling functions.

The resampled data x(m) are usually non-stationary and weakly correlated. Therefore any performance analysis should be used cautiously if it is based on the assumption that the transmitted data are white. Nevertheless, simulation results still suggest that the residual error estimation is acceptable. These results are not so surprising because the data $a_l$ before resampling are white and thus the resampled data should contain all the necessary modes to excite all the frequencies of interest. If the transmitted signal is upsampled, the covariance matrix Z*Z (where * represents conjugate and transpose; the Z matrix is discussed in more detail below) made of x(m) is close to singular and the least-squares estimator can not be applied directly. One solution is to expand the bandwidth of the signal x(m) to the bandwidth of the receiver filter during the resampling process. This expansion of the bandwidth will give the covariance matrix a good condition number and cause a negligible effect in the estimation error.

First Timing Offset Estimation

Figure 5:
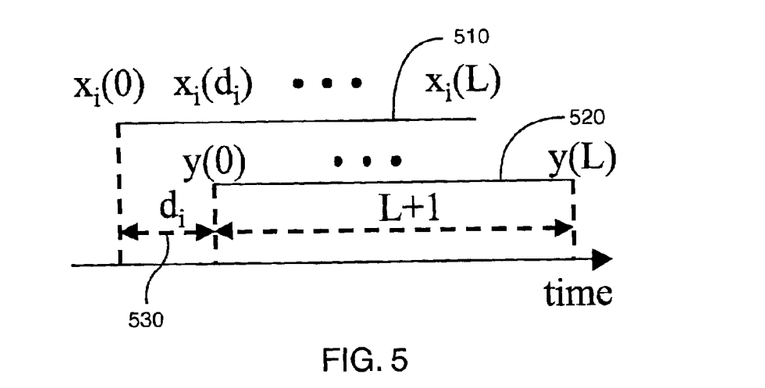
FIG. 5 is a diagrammatic representation of the time stamp misalignment of a transmitted crosstalk signal and the signal of a receiver.

Even though the data from various services have been resampled to correct for sampling rate differences, as mentioned above, different modems from which data are collected may have different time stamps. Consequently, predefined time spans defining the time period during which data are collected from different modems might not be strictly aligned together, as shown in FIG. 5. Even though they have the same number of data samples L+1 (that is, are the same length), a transmitted signal x(m) 510 may lag or lead a received signal y(m) 520 by a timing difference or offset, $d_i$ 530. Therefore, in the present invention, the collected data are initially evaluated to determine whether timing offsets exist between the received signal and the transmitted crosstalk signals' data. If such timing offsets are present, they can be estimated.

To start the analysis of the respective timing offsets between the received signal and the transmitted signals, and without a loss of generality, all transmitters are assumed to have non-negative timing differences ($d_i \geq 0$) with respect to the time stamp of the designated receiver. Using the data available for analysis, the received signal can be characterized as:

$$y(m) = \sum_{i=0}^{K} h_i(m) * x_i(m + d_i) + n(m) \tag{7}$$

where $x_i$: the transmitted data $h_i$: the channel response (i=0) or the crosstalk function (i>0)

$d_i$: the timing difference n: white Gaussian noise

K: the number of crosstalkers.

In general, the channel response $h_0(m)$ is known and $d_0$ equals zero because the transmitter and the receiver at both ends of the same channel are synchronized. As a result, the originally transmitted signal component can be subtracted from the received signal. Therefore, the remaining crosstalkers can be considered.

Since the timing differences $d_i$ could be several thousand symbols, it is computationally prohibitive to apply the classical least-squares method directly to Eq. (7). A cross-correlation is first used to estimate the timing differences $d_i$ of the dominant crosstalkers. Where a primary signal contains contamination from a secondary, known signal (as in the case of crosstalk in communications lines), a cross-correlation of the two signals will yield information regarding the relative "spacing" of the signals. That is, approximate timing offsets of primary and crosstalk signals can be determined by looking for indications of a crosstalker's interfering signal in the received signal and evaluating various offsets of the crosstalker's signal in the received signal. An estimate of a timing offset can thus be found which yields a relatively high correlation between the received signal and the crosstalk generating signal. By getting a "ballpark" estimate of the timing offsets, a classical least squares approach can later be applied with reliability.

Once the timing differences of the significant crosstalkers are approximated, the cross talk functions are identified by a least-squares estimator and the crosstalkers are subtracted from the received signal. The subtraction of the dominant crosstalkers makes it easier to estimate the timing difference for the smaller crosstalkers. This successive cancellation process may be repeated until all interested crosstalk functions are identified.

Timing Differences Estimation Using Cross-correlations

Cross-correlation is used in the present invention in a new way for xDSL systems. Specifically, there are many crosstalks, which have unknown responses $h_i$ with many taps. The exact delay estimation is not required in this step. Instead, a relatively coarse first estimate of each timing difference $d_i$ is obtained. As will be seen below, such an estimation permits identification (and removal) of significant crosstalkers, especially in connection with subsequently seeking out and identifying smaller crosstalkers in the received signal.

The cross-correlation between the received signal y(m) and the crosstalk transmission signals is defined as:

$$R_{yx_i}(l) = E\{y(m)x_i^*(m+l)\}. \quad (8)$$

For purposes of this analysis, the transmitted data from different users are assumed to be independent and have zero mean, i.e., $E(x_i x_j) = 0$ for $i \neq j$, and $E(x_i) = 0$. The noise is uncorrelated with all users' data. The number of taps for $h_i$ is assumed to be $v_i + 1$. Then by substitution of y(m), Eq. (8) can be rewritten as:

$$R_{yx_i}(l) = \sum_{t=0}^{v_i} h_i(t) R_{x_i}(l - d_i + t) \quad (9)$$

where $R_{xi}$ is the autocorrelation function of $x_i$. In the ideal case where the transmitted data $x_i$ are uncorrelated and have an average energy of $\epsilon_i$ (that is, where $R_{xi}(k) = \epsilon_i \delta(k)$):

$$R_{yx_i}(l) = \epsilon_i h_i(d_i - l). \quad (10)$$

Because the crosstalk function is a causal finite impulse response (FIR), the timing delay $d_i$ can be estimated by the maximum $1_d$ such that $|R_{yxi}(1_d)| > 0$. Unfortunately, the autocorrelation of the transmitted data is rarely a delta function in xDSL systems and can only be obtained approximately by averaging over a large number of data samples. Therefore, it is difficult to identify the crosstalk function directly from Eq. (9). Nevertheless, it is possible to use this equation to roughly estimate the timing difference $d_i$ by searching for the peak of $|R_{yxi}(1_d)|$, that is:

$$\tilde{d}_i = \underset{l}{\operatorname{argmax}} |R_{yx_i}(l)|. \quad (11)$$

The applicability of this method is strongly justified when one observes that the transmitted data are very loosely correlated (the auto-correlation function $R_{x_i}(k)$ is almost equal to zero if k is larger than several symbols), and that $h_i(t)$ is an FIR filter and has a narrow peak in the time domain.

The cross-correlation $R_{yx_i}$ is approximated by averaging over many data samples:

$$\tilde{R}_{yx_i}(l) = \frac{1}{N} \sum_{m=1}^{N} y(m) x_i^*(m+l) \quad (12)$$

where N is the total number of the data symbols used for averaging. As will be appreciated by those skilled in the art, the greater the number of data samples N that are used, the more accurate the approximation of the cross-correlation. However, the computational complexity of this method is approximately $O(Nd_i)$ for user i. Therefore, from a practical standpoint, the number of data symbols N should be carefully selected to achieve a relatively good balance between the computational complexity and the accuracy of the estimation. The rough estimation of N is discussed below.

The mean of the cross-correlation $\tilde{R}_{yx_i}(l)$ is $E(\tilde{R}_{yx_i}(l)) = R_{yx_i}(l)$. The variance of the cross-correlation $R_{yx_i}$ is:

$$\sigma_R^2 = \operatorname{var}(\tilde{R}_{yx_i}(l)) \quad (13)$$

$$\approx \frac{\epsilon_i}{N} \left( \sum_{j=1}^{K} \epsilon_j \|h_j\|^2 + \sigma_n^2 \right) \quad (14)$$

where $\|h_j\|$ is the norm of the crosstalk function $h_j(t)$. This above approximation is surprisingly simple in which user j contributes $\epsilon_j \|h_j\|^2$ to the variance. To detect the peak value of the cross-correlation $|\tilde{R}_{yx_i}(l)|$ reliably, the ratio of the peak to the standard deviation $\sigma_R$ can be set to a large value, for example:

$$\frac{\max(|\tilde{R}_{yx_i}(l)|)}{\sigma_R} > a = 10 \quad (15)$$

This is equivalent to:

$$N > \frac{a^2 \epsilon_i \left( \sum_{j=1}^{K} \epsilon_j \|h_j\|^2 + \sigma_n^2 \right)}{(\max(\tilde{R}_{yx_i}(l)))^2} \quad (16)$$

If all users are assumed to have the same energy (that is, $\epsilon_i = \epsilon_j$) and the transmitted data are temporally uncorrelated, the inequality can be further simplified to $$N > \frac{a^2 \left( \sum_{j=1}^{K} \|h_j\|^2 + \sigma_n^2 / \epsilon_i \right)}{(\max(|h_i|))^2} \quad (17)$$

which provides us a good guidance to select a reasonable number for N. In typical xDSL systems, the background noise n is very small (−140 dBm) so that $$\frac{\sigma_n^2}{\epsilon_i}$$

in Eq. (17) can be ignored in estimating N. Two particular exemplary cases are presented here as illustrative.

EXAMPLE 1

Suppose there are 10 crosstalkers (K=10) that have the same orders of magnitude, that is, $\|h_j\| \approx \|h_i\| \approx \max(\|h_i\|)$ for all j. Then, reducing Eq. 8 accordingly (with a=10, as noted above), $N \approx a^2 K=1000$ provides a good estimation (that is, 1000 samples should yield an accurate estimate of the timing difference).

EXAMPLE 2

Suppose that crosstalker 2 is dominant, and is 20 dB above the other crosstalkers, that is, $\|h_2\| \approx 10\|h_i\|, i \neq 2$. Then for crosstalker 2, $N \approx a^2 = 100$. However, to estimate the timing offset of other crosstalkers, $N \approx 100 a^2 = 10,000$. If there are not enough data available, the dominant crosstalkers need to be canceled first and the timing offset estimation for the others is performed afterwards. In some cases, the smaller crosstalkers can be ignored; they will not substantially affect the received signal. Once the large crosstalker in this example is removed, the other crosstalk signals can be addressed.

Crosstalk Function Estimations

After estimating the coarse timing differences $d_i$ between the input(s) from any considered crosstalk signal(s) and the received signal, the crosstalk functions and more accurate timing differences can be obtained jointly by a least-squares estimator. In some cases, if some crosstalkers are too small, then the timing differences found through cross-correlation may not be accurate enough for the least-squares estimator. Depending on the objective, those small crosstalkers can either be ignored or they can be identified after finding the strong crosstalkers first and subtracting those strong crosstalkers from the received signal. Once the strong crosstalkers are removed, the methods and apparatus of the present invention can be applied in an iterative fashion to identify (and remove if necessary or desirable) successively weaker crosstalk interference signals.

The error $\Delta_i$ in the timing difference estimation determined using the cross-correlation technique above can be expressed as $\Delta_i = d_i - \tilde{d}_i$ and the shifted input as $z_i = x_i(m + \tilde{d}_i)$. Then the crosstalk network model of Eq. 7 can be rewritten (using the same notations) as:

$$y(m) = \sum_{i=1}^{K} h_i(m) * z_i(m + \Delta_i) + n(m) \quad (18)$$

In the ideal case where the transmitted signals are uncorrelated (that is, where $R_{x_i}(m) = \epsilon_i \delta(m)$), $\Delta_i$ is the tap number where the absolute crosstalk response $|h_i(\Delta_i)|$ has a peak value. In practice, typically, the transmitted data are weakly correlated. As a result, $d_i$ should be in the vicinity of the tap where the absolute crosstalk response has its maximum. That is, mathematically, $\Delta_i \approx \arg\max_m(|h_i(m)|)$ and $0 \leq \Delta_i \leq v_i$.

Note that the exact length of the crosstalk response $v_i + 1$ is unknown. Fortunately, in xDSL systems, the upper bound of the length is empirically available, which can be used to approximate $v_i$. Joint detection of the crosstalk response and the delay is based on the following:

1) the length of the crosstalk response is assumed to be $2v_i + 1$ in order to include the effect of the timing offset $\Delta_i$;

2) a least-squares estimator is used to estimate the crosstalk response of length $2v_i + 1$; and 3) those taps whose coefficients are almost equal to zero are found in the head and the tail of the considered crosstalk response of length $2v_i + 1$, which can be used to find the timing offset $\Delta_i$.

By truncating the taps that are almost zero, the crosstalk response is obtained. The matrix representation of Eq. (18) can be written as:

$$y = [Z_1 \; Z_2 \; \ldots \; Z_K] \cdot \begin{bmatrix} h_1 \\ h_2 \\ \vdots \\ h_K \end{bmatrix} + n \quad (19)$$

$$= Z \cdot h + n \quad (20)$$

where y is the received signal vector, $Z_i \in C^{N \times (v_i + 1)}$ is the transmitted Toeplitz data matrix, and $h_i$ is the crosstalk response vector, (i=1, ..., K) as shown more specifically as follows:

$$y = [y(N-1) y(N-2) \ldots y(0)]^T \quad (21)$$

$$Z_i = \begin{bmatrix} z_i(N-1-v_i+\Delta_i) & \ldots & z_i(N-1+\Delta_i) \\ \vdots & \ddots & \vdots \\ z_i(-v_i+\Delta_i) & \ldots & z_i(\Delta_i) \end{bmatrix} \quad (22)$$

$$h_i = [h_i(v_i) h_i(v_i-1) \ldots h_i(0)]^T \quad (23)$$

where N is the number of data samples and $^T$ represents transpose. Since $\Delta_i \in [0, v_i]$, we can extend each row of the data matrix $Z_i$ and the crosstalk response vector $h_i$ in both directions, as follows:

$$h_i = [h_i(v_i + \Delta_i) \ldots h_i(v_i) \ldots h_i(0) \ldots h_i(\Delta_i - v_i)]^T \quad (24)$$

$$Z_i = \begin{bmatrix} z_i(N-1-v_i) & \ldots & z_i(N-1+v_i) \\ \vdots & \ddots & \vdots \\ z_i(-v_i) & \ldots & z_i(v_i) \end{bmatrix} \quad (25)$$

where $Z_i \in C^{N \times (2v_i + 1)}$ and $h_i \in C^{(2v_i + 1) \times i}$. The same notations are used in Eqs. (21) through (25) to avoid notation explosion. Note that $h_i$ are padded with $\Delta_i$ zeros on the top and $v_i - \Delta_i$ zeros in the bottom. From Eq. (20), the unbiased estimation of h is as follows:

$$\hat{h} = (Z^* Z)^{-1} Z^* y \quad (13)$$

where * represents conjugate and transpose. By truncating those taps corresponding to relatively small values in both sides of the vector $\hat{h}$, we obtain the crosstalk response and the timing offset $\Delta_i$. Those of ordinary skill in the art will be aware of fast algorithms for calculating Eq. (26) utilizing the Toeplitz structure of the data matrix. Specific examples can be found in the following:

J. M. Cioffi and T. Kailath, "Fast, Recursive-Least-Squares Transversal Filters for Adaptive Filtering", *IEEE Trans. Acoust., Speech, Signal Proc.*, vol. ASSP-32, April 1984, p.304–336; and J. M. Cioffi, "The Block-Processing FTF Adaptive Algorithm", *IEEE Trans. Acoust., Speech, Signal Proc.*, vol. ASSP-34, February 1986, p.77–90.

Selection of the number of data symbols N in the present invention can yield good estimation errors. Generally, it has been found that the estimation error level can be kept at about the same level as the noise when the number of data symbols is at least twice the number of estimated parameters M. Doubling the number of data symbols again would reduce the estimation error by another 3 dB. For the complex input data, the equations are slightly different, but the rule still applies.

Simulation Results

Simulation results of the crosstalk identification of the present invention in the upstream direction (from the subscriber to the central office) have produced some very favorable results. The receiver is assumed to be an ADSL modem. The number and the type of the crosstalks are assumed in the following to reflect the typical crosstalk environment:

4 Basic Rate ISDNs (BRIs)
4 HDSLs
5 ADSLs

All twisted pairs are assumed to be 26-gauge (0.4 mm) and 9000-feet (2744 m) long. The dominant crosstalks consist of NEXTs from BRIs and HDSLs. There is no NEXT from ADSL because most of the deployed ADSL modems use a frequency-division duplexing scheme. The smaller crosstalks consist of FEXTs from ADSLs, BRIs, and HDSLs. Several characteristics of xDSLs from Annex B of the ADSL standard (ANSI Standard T1.413 for ADSL) also were used.

The transmit filters (including pulse shaping filters) from different types of DSLs can also be found in the ADSL standard or the corresponding standards. The models for NEXT and FEXT are commonly known.

Figure 6:
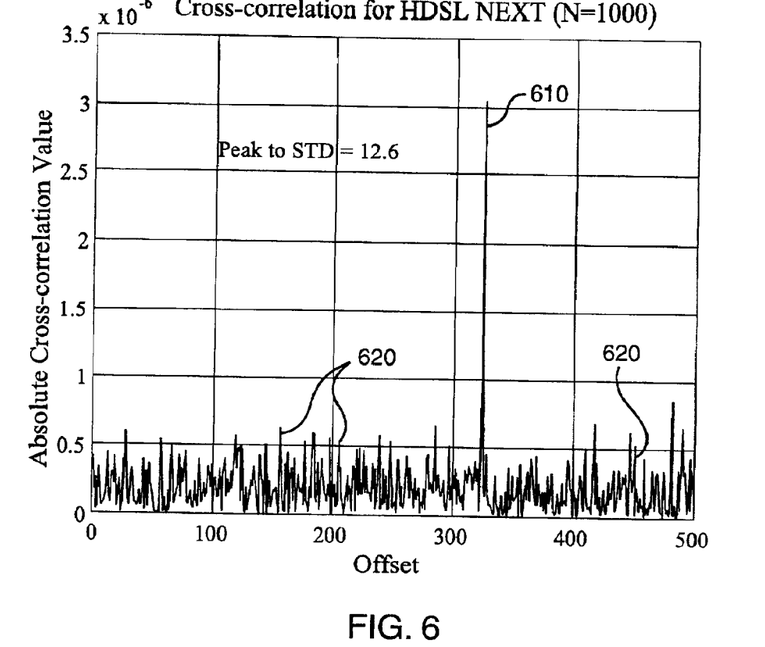
FIG. 6 is an example of a simulated cross-correlation for HDSL NEXT calculated using 1000 data samples and showing the absolute cross-correlation value as a function of the timing offset of a transmitted set of crosstalk data.

In the simulation, each crosstalk signal was transmitted with a random timing offset with respect to the ADSL receiver. This integer offset was uniformly distributed. The fractional delay was absorbed into the crosstalk function as described above in Eq. (4). The NEXTs were identified first. The cross-correlation technique was used to grossly estimate these timing offsets. As expected, and as shown in an example in FIG. 6 the peak value 610 was much higher than the rest of values (for example, values 620) and gave a good first estimate of the timing offset.

Figure 7:
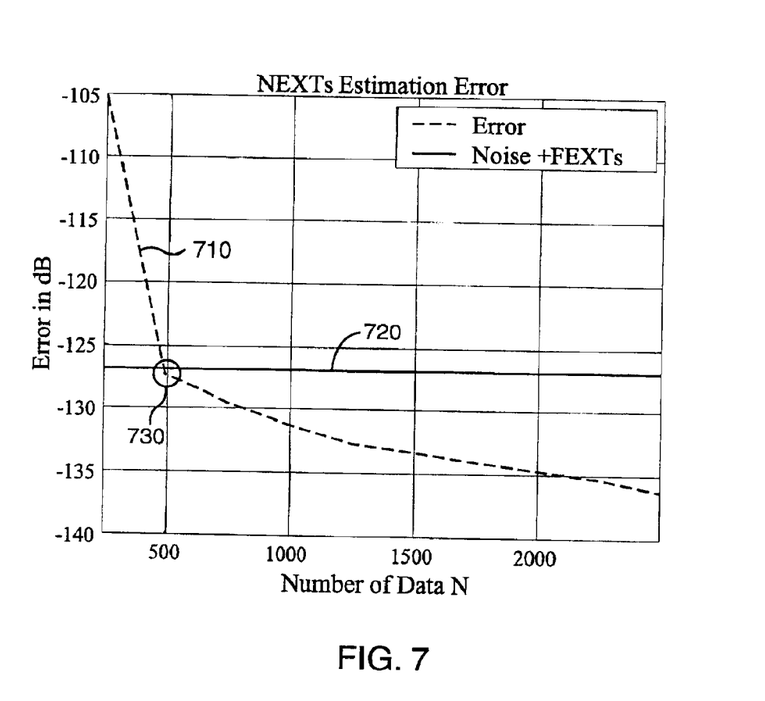
FIG. 7 is a graphical comparison of the crosstalk estimation error as a function of the number of data samples used to identify the crosstalk response, further compared to the combined noise and FEXT interference in the received signal.

With the first estimate of the timing offset, a least-squares estimator was used to identify the crosstalk responses. The results of this process were consistent with the results predicted above. As seen in FIG. 7, when the number of data samples N was greater than twice the number of estimated parameters, the crosstalk function estimation error (line 710) generally was comparable to the noise (line 720), which is generally quite low. In fact, N=2M+1 was a critical turning point (shown approximately at point 730), where M is the number of estimated parameters. In the simulation, M was:

$$M = \sum_{i=1}^{8}(v_i + 1) = 248$$

When N>2M, doubling the number of the data symbols reduced the error 3 dB. However, the error grew rapidly when the amount of data was less than 2M.

It also may be useful to identify smaller crosstalkers, such as FEXTs. Since they are much smaller than NEXTs, the NEXTs are first identified and subtracted from the received signal. The above steps of cross-correlation and least-squares estimation can be applied again in one or more successive applications to the received signal (now lacking the stronger NEXT crosstalkers) to find the FEXT functions (and any other weaker crosstalk signals). The simulation results were similar. The case where the real measured NEXTs and FEXTs data are used also was simulated. The results again were consistent with the analysis.

Figure 8:
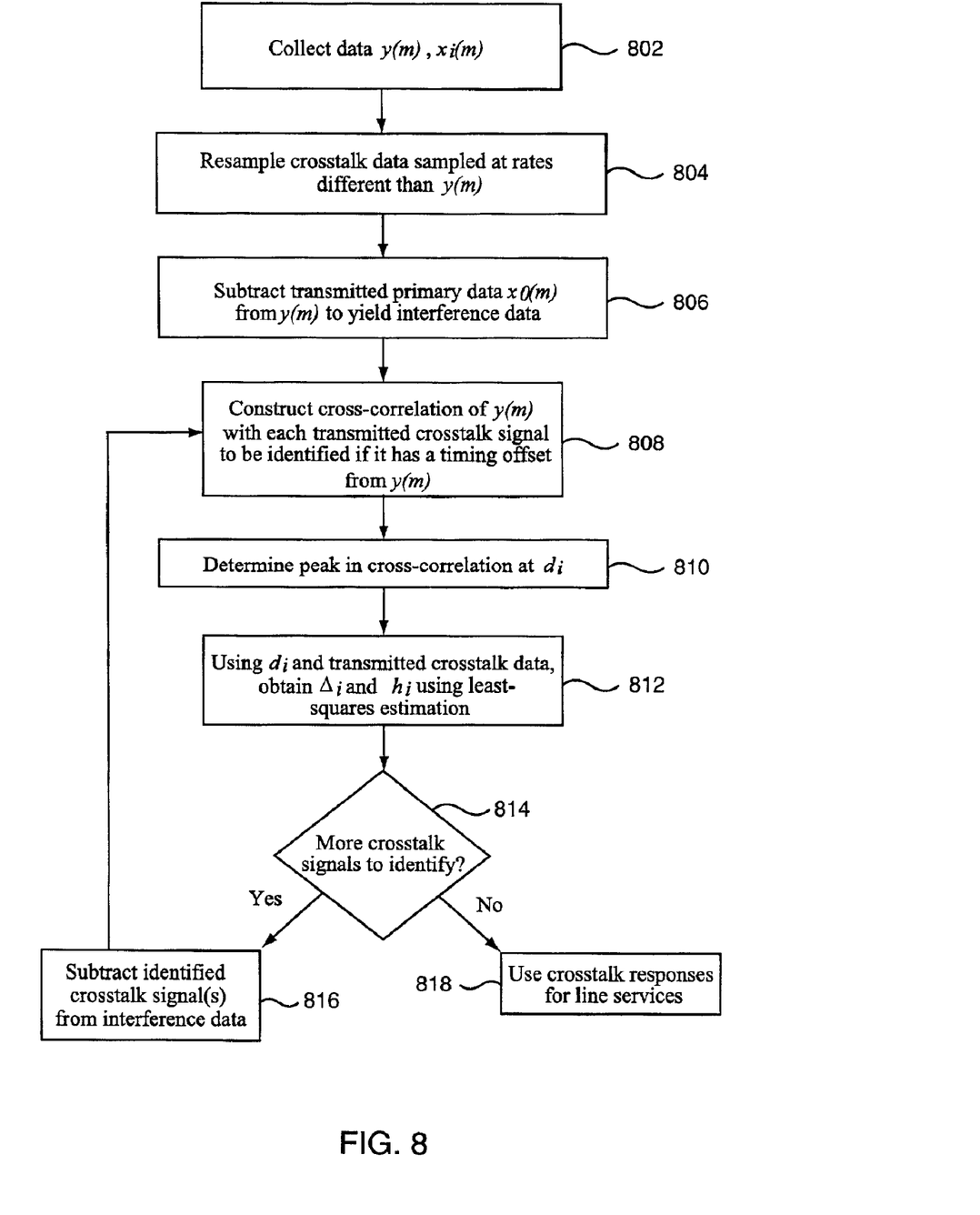
FIG. 8 is a flow chart demonstrating an approach to processing data, according to another example embodiment o the present invention.

FIG. 8 illustrates briefly one embodiment of the methodology of the present invention. Initially, at 802, data y(m) is collected from the receiver and data transmitted data $x_i(m)$ is collected from the transmitters. At 804, any of the data that were originally sampled at rates different then the receiver's rate are resampled. At 806 the primary transmitted data $x_0(m)$ may be subtracted if desired from the received data y(m) to yield interference data which includes crosstalk data. At 808, if timing offsets exist between the received data and the crosstalk data, a cross-correlation of the received data with each such crosstalk signal is constructed at 808. At 810 a peak is determined in each cross-correlation to determine the first estimate $d_i$ of the timing offset between the received signal and the considered crosstalk signal. Using $d_i$ and the transmitted crosstalk data, at 812, each crosstalk response $h_i$ and a second estimate of each timing offset $\Delta_i$ are estimated using a least-squares estimation. At 814, a decision is made as to whether there are more crosstalk signals to identify. If "yes", at 816, then the procedure just described beginning at 808 can be repeated (successively, if appropriate). For example, if strong crosstalk signals are going to be removed first and weaker signals found and identified later, then the process of FIG. 8 can be applied to the strong crosstalkers, those strong crosstalkers removed, and weaker crosstalkers found thereafter using this process. If "no" further crosstalk signals are to be identified, at 818, the identified crosstalk responses can be used for line services as described herein. Of course, variations on this embodiment will be apparent to those of ordinary skill in the art, depending on the particular goals of the analysis and crosstalk identification.

As noted above, it is contemplated that the identification of crosstalk according to one or more embodiments of the present invention could be used in various services relating to DSl, systems. One example of such services is dynamic spectrum management. Unbundling architecture at the remote terminal, the "central office side" of a DSL line, is still largely undecided. Spectrum management and DSL standardization to date have investigated only the situations where service providers energize the physical transmission lines with independently generated signals. Spectra for the different types of DSL signals has been specified for worst-case crosstalking situations with the goal of minimum service disruption among the various DSL signals. Necessarily, such static worst-case spectrum management reduces achievable data rates and symmetries with DSL.

The results of application of the present invention could be used in connection with other features relating to improving DSL technology through dynamic spectra management. For example, entities controlling spectra could be informed of identified crosstalk functions and other results of the application of the present invention. Moreover, that information could be used to adjust the spectra of one or more DSL lines to improve performance. Finally, systems could be developed for coordinating line spectra and line signals (for example, vectoring) to improve DSL performance. More specifically, crosstalk functions affecting a number of transmitted signals in transmission lines are identified using the present invention. The transmitted signals can then be synchronized at their respective transmitters. Additionally, the transmitted signals can also be coordinated to mitigate or cancel the mutual crosstalk that affects those signals. Similarly, receivers can be coordinated to mitigate their signals. Again, crosstalk functions affecting the signals received by the receivers can be identified using the present invention. After the received signals are collected from their respective receivers, the mutual crosstalk affecting the signals can be mitigated or canceled using digital signal processing.

The results of application of the present invention could be used in connection with other features relating to improving DSL technology through dynamic spectra management.

For example, entities controlling spectra could be informed of identified crosstalk functions and other results of the application of the present invention. Moreover, that information could be used to adjust the spectra of one or more DSL lines to improve performance. Finally, systems could be developed for coordinating line spectra and line in at the signal level (for example, vectoring) to improve DSL performance. More specifically, crosstalk functions affecting a number of transmitted signals in transmission lines are identified using the present invention. The transmitted signals can then be synchronized at their respective transmitters. Additionally, the transmitted signals can also be coordinated to mitigate or cancel the mutual crosstalk that affects those signals. Similarly, receivers can be coordinated to mitigate their signals. Again, crosstalk functions affecting the signals received by the receivers can be identified using the present invention. After the received signals are collected from their respective receivers, the mutual crosstalk affecting the signals can be mitigated or canceled using digital signal processing.

It is intended that the following appended claims be interpreted as including all such alterations, permutations, and equivalents as fall within the true spirit and scope of the present invention.

What is claimed is:

1. A method of identifying crosstalk in a received signal, the method comprising:
    collecting received data corresponding to the received signal from a receiver;
    collecting primary data from a primary transmitter;
    collecting crosstalk data from a crosstalk transmitter;
    identifying a crosstalk function corresponding to the crosstalk data;
    collecting a plurality of sets of crosstalk data from a plurality of crosstalk transmitters, the plurality of sets of crosstalk data comprising a set of strong crosstalk signal data corresponding to a strong crosstalk signal and a set of weak crosstalk signal data corresponding to a weak crosstalk signal;
    determining whether a timing offset exists between the received data and the set of strong crosstalk signal data;
    generating a first estimate of any determined timing offset between the received data and the set of strong crosstalk signal data;
    identifying a strong crosstalk function corresponding to the strong crosstalk signal data;
    subtracting the strong crosstalk function from the received signal to generate a modified received signal;
    determining whether a timing offset exists between the received data and the set of weak crosstalk signal data;
    generating a first estimate of any determined timing offset between the modified received signal and the weak crosstalk signal data; and
    identifying a weak crosstalk function corresponding to the weak crosstalk signal data.

2. A method of identifying crosstalk in a received signal, the method comprising:
    collecting received data corresponding to the received signal from a receiver;
    collecting primary data from a primary transmitter;
    collecting crosstalk data from a crosstalk transmitter;
    subtracting the primary data from the received data prior to determining first estimate of the timing offset between the received data and the crosstalk data;
    determining a first estimate of a timing offset between the received data and the crosstalk data; and
    identifying a crosstalk function corresponding to the crosstalk data.

3. A method of crosstalk in a received signal, the method comprising:
    collecting received data corresponding to the received signal from a receiver;
    collecting primary data from a primary transmitter;
    collecting crosstalk data from a crosstalk transmitter;
    identifying a crosstalk function corresponding to the crosstalk data; and
    performing multiuser detection using the identified crosstalk function.

4. A system for identifying crosstalk comprising:
    a first transmitter configured to transmit a first signal;
    a second transmitter configured to transmit a second signal;
    a receiver configured to receive a combined signal, the combined signal comprising the first signal and crosstalk interference from the second signal; and
    a processor comprising:
        a data collector in communication with the first transmitter, the second transmitter and the receiver, the collector configured to collect:
            a first signal data set corresponding to the first signal;
            a second signal data set corresponding to the second signal; and
            a combined signal data set corresponding to the combined signal;
        a crosstalk identifier connected to the data collector comprising:
            a first timing offset estimator configured to calculate a first estimate of a timing offset between the combined signal and the second signal; and
            a crosstalk response estimator configured to estimate the crosstalk interference present in the combined signal and also configured to calculate a second estimate of the timing offset.

5. The system of claim 4 wherein the processor is located at a location remote from the first and second transmitters and the receiver.

6. A system for identifying crosstalk comprising:
    a first transmitter configured to transmit a first signal;
    a second transmitter configured to transmit a second signal;
    a receiver configured receive a combined signal, the combined signal comprising the first signal an crosstalk interference from the second signal; and
    a processor comprising:
        a data collector in communication with the first transmitter, the second transmitter and the receiver, the collector configured to collect:
            a first signal data set corresponding to the first signal;
            a second signal data set corresponding to the second signal; and
            a combined signal data set corresponding to the combined signal;
        a crosstalk identifier connected to the data collector comprising:
            a crosstalk response estimator configured to estimate the crosstalk interference present in the combined signal; and
        a data conditioner, connected to the data collector, configured to resample collected data.

7. A system for identifying crosstalk comprising:

a first transmitter configured to transmit a first signal;

a second transmitter configured to transmit a second signal;

a receiver configured to receive a combined signal, the combined signal comprising the first signal and crosstalk interference from the second signal; and a processor comprising:
- a data collector in communication with the first transmitter, the second transmitter and the receiver, the collector configured to collect:
  - a first signal data set corresponding to the first signal;
  - a second signal data set corresponding to the second signal; and
  - a combined signal data set corresponding to the combined signal;
- a crosstalk identifier connected to the data collector comprising:

a crosstalk response estimator configured to estimate the crosstalk interference present in the combined signal; and a data subtractor configure to subtract the first signal from the combined signal to generate an interference signal.

8. A crosstalk identifier comprising:

a collector configured to collect data from a primary signal transmitter, from a crosstalk signal transmitter and from a receiver;

a crosstalk estimator in communication with the collector, the crosstalk estimator configured to determine a firs estimate of a crosstalk response in the data from the receiver and further configured to determine a second estimate of the timing offset between the data from the receiver and the data from the crosstalk signal transmitter; and a timing estimator connected to the collector, the timing estimator configured to determine a first estimate of a timing offset between the data from the receiver and the data from the crosstalk signal transmitter.

9. The identifier of claim 8 wherein the crosstalk estimator uses a least-squares estimator to determine a second estimate of the timing offset.

10. A method for identifying crosstalk in a received signal caused by interference from a crosstalk signal, the method comprising:

collecting received data from receiver that has received the received signal during a specified time period;

collecting primary data transmitted as a primary signal during the specified time period;

collecting crosstalk data transmitted as a first crosstalk signal during the specified time period;

subtracting the primary data from the received data to generate interference data;

determining a first estimate of a timing offset between the received signal and the first crosstalk signal, comprising cross-correlating the interference data and the crosstalk data;

identifying a crosstalk function corresponding to the crosstalk signal, comprising performing a least-squares estimation to identify the crosstalk function and the crosstalk signal using the interference data and the first estimate of the timing offset.

11. A method of dynamically managing spectra in a DSL system, the method comprising:

identifying crosstalk functions and characteristics in the DSL system as a function of a differential between known transmitted data and a combined signal, the combined signal including the known transmitted data and crosstalk noise;

transferring information concerning the identified crosstalk functions; and controlling, as a function of th transferred information, line spectra in modems in the DSL system.

12. The method of claim 11 wherein identifying crosstalk functions and characteristics in the DSL system includes determining an interference signal as a function of the differential and identifying a crosstalk function based on the known transmitted data and the interference signal, and wherein controlling line spectra in modems in the DSL system includes adjusting spectra in the DSL system to reduce crosstalk interference.

13. The method of claim 11 wherein the step of identifying crosstalk functions and characteristics in the DSL system includes the step of identifying crosstalk in a received signal, identifying crosstalk in a received signal comprising: collecting received data corresponding to the received signal from a receiver; collecting primary data from a primary transmitter; collecting crosstalk data from a crosstalk transmitter; identifying a crosstalk function corresponding to the crosstalk data.

* * * * *